May 6, 1958  R. L. WADDELL  2,833,903
FULLY AUTOMATIC ELECTRIC IRON
Filed Feb. 16, 1956
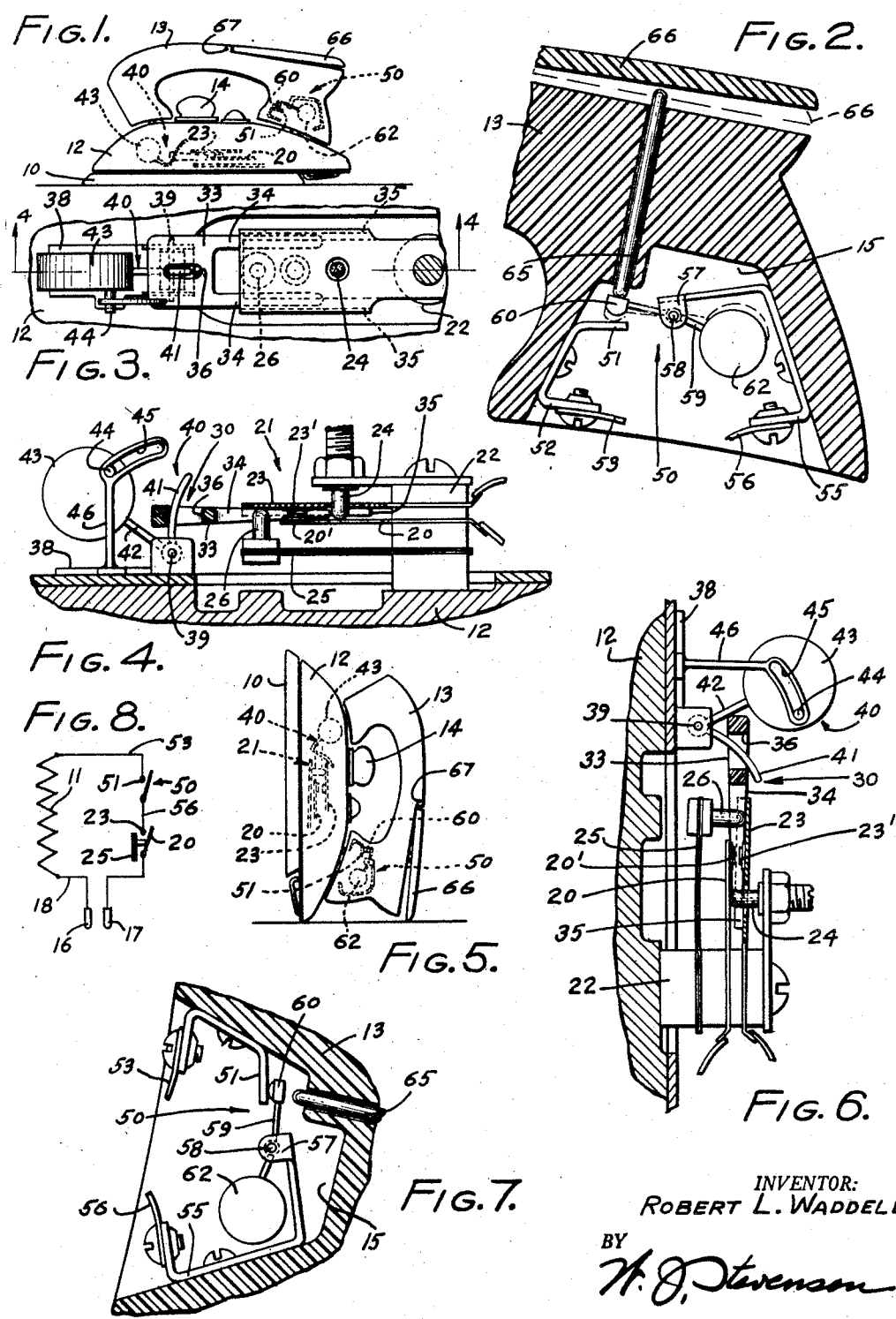
INVENTOR:
ROBERT L. WADDELL
BY
H. J. Stevenson

United States Patent Office 2,833,903
Patented May 6, 1958

2,833,903

FULLY AUTOMATIC ELECTRIC IRON

Robert L. Waddell, Inglewood, Calif.

Application February 16, 1956, Serial No. 565,888

13 Claims. (Cl. 219—25)

This invention relates generally to electric irons for ironing or pressing textile fabrics and articles of apparel, and particularly to an electric iron embodying thermostat means for controlling the temperature of the iron.

The invention is concerned with an improved electric iron of a "fully automatic" type, this term being intended to designate an electric iron which embodies means for opening the electric circuit when the iron is not in use and for closing the circuit when the iron is in use.

Electric irons currently employed draw electric current continuously when not in use unless the operator actuates the switch or disconnects the electric cord from the service outlet. Due to this fact, a conventional electric iron, if left in an ironing position in contact with inflammable material, such as cotton, wool, wood, etc., presents a serious fire hazard.

Most electric irons that have a control or heat regulator use a bi-metallic thermostat to make and break the flow of electricity through the heating element in the iron. These thermostats in the main circuit consist of two pieces of spring metal tending to spring in the same direction with a piece of contact metal on each. These two pieces of metal are secured in such a manner that they maintain contact with each other at all times unless an outside force is used to separate them. The outside force in these thermostats is applied by the use of a piece of bi-metallic spring which will bend only in one direction as heat is applied. By means of a piece of insulated material attached to this bi-metallic strip it is possible to force one of the pieces of spring metal away from the other, thereby breaking the electric circuit. As the heat diminishes, the bi-metallic strip will return to its original position, allowing the spring metal to once again make contact. This will reactivate the heating element, thereby starting the cycle over again. This cycle of heating and cooling will continue indefinitely so long as electricity is supplied to these units, that is, whether the iron is in use or not.

It is therefore an object of my invention to provide a fully automatic electric iron which has incorporated therein means for discontinuing the flow of electricity when the iron is not in use, thereby effecting a substantial saving in the amount of electricity and, consequently, a saving of money to the user in lower electric service charges. In addition, by this provision the present iron is allowed to cool when the iron is left in a horizontal ironing position and the danger of fire is effectively avoided.

Another object of the invention is to provide a fully automatic electric iron in which the means for discontinuing the flow of electricity when the iron is not being used includes a thermostat arrestor which operates in conjunction with the usual bi-metallic thermostat, this arrestor consisting of a movable wedge-shaped element of dielectric material located between the two spring contacts of the thermostat. When the iron is placed in a substantially vertical position of rest, the arrestor element is free to descend into position between the thermostat contacts, when the latter opens due to cooling of the iron. The element thus functions to prevent closing of the contacts and as a result the circuit will remain open to allow cooling of the iron.

It is, of course, necessary that the arrestor element be withdrawn from between the thermostat contacts when it is desired to again use the iron. It is therefore another object of the invention to provide an iron, of the character referred to, which includes a weight-actuated rocker-arm operatively connected by a rod to said wedge-shaped arrestor element and adapted, when the iron is tilted upwardly to its inoperative position, to release the arrestor element for movement into position between the thermostat contacts when the latter are opened by the thermostat action. By this provision, when the iron is later moved to a horizontal ironing position, the gravity- or weight-actuated rocker arm and rod are actuated in a direction to withdraw the arrestor element from between the contacts so as to reestablish flow of current through the contacts to the heating element of the iron.

Another important object of the invention is to provide an electric iron of the type indicated in which is embodied means by which flow of current to the thermostat and heating element is made possible only when the handle of the iron is grasped by the user. By this means, when the iron is left in an ironing position unattended by the user, the flow of electric current to the heating element is disrupted so that cooling of the iron is effected to avoid fire hazard. According to another object and feature of the invention, this means includes a switch or circuit breaker connected in series with the thermostat contacts and the heating element, the switch having a fixed contact and a movable contact carried by a weight-actuated switch arm. The arrangement of the switch parts is such that when the iron is placed in horizontal ironing position, the weighted arm is swung to a position to separate its movable contact from the fixed contact, thereby opening the circuit to the thermostat contacts, regardless of whether the latter are open or closed.

Another object of the invention is to provide an iron of the class specified which includes manually-controlled means for maintaining the switch closed during an ironing operation. In accordance with the invention, this manual control means preferably consists of a plunger rod slidable in the handle of the iron and having an inner end in engagement with the movable contact of said weight-actuated switch arm, and a pressure-plate pivoted on the handle in a position to be depressed by the palm of the operator's hand when the iron is being used, said pressure plate serving to depress the plunger so as to close the switch contacts and maintain the circuit closed to the thermostat contacts. When the pressure-plate is released, the weight-actuated switch arm slides the plunger upwardly to allow separation of the movable contact from the fixed contact, thereby opening the circuit to allow cooling of the iron.

A further object of the invention is to provide, in an electric iron, a relatively simple control means rendering the iron fully automatic in operation, said control means being inexpensive to produce and install in the iron, said control means being weight-operated to avoid the use of springs which would deteriorate quickly due to the heat generated in the iron. A related object is to provide control means which are positive in action and which will require little, if any, servicing over long periods of time.

Further objects of the invention will appear from the following description and from the drawing which is intended for the purpose of illustration only, and in which:

Fig. 1 is a small scale, side elevational view of the present fully automatic electric iron, showing the relative positions of the circuit control elements when the iron is in its horizontal, operative position;

Fig. 2 is an enlarged longitudinal sectional view through the rear portion of the handle, showing the relation of the switch parts when the iron is in its operating position;

Fig. 3 is a plan view of the thermostat contact arrestor or control means;

Fig. 4 is a side elevational view of the same, shown part-sectional on line 4—4 of Fig. 3;

Fig. 5 is a view similar to Fig. 1, indicating the relation of the parts of the control means when the iron is in its standing or inoperative position;

Fig. 6 is a view similar to Fig. 4, illustrating the function of the contact arrestor means when the iron is in its erect, inoperative position;

Fig. 7 is a view similar to Fig. 2, showing the handle switch closed, as when th iron is placed in its inoperative position; and Fig. 8 is a diagram of the electric circuit of the iron.

Referring to the drawings in detail, the improved, fully-automatic, electric iron has the general appearance of a conventional electric iron, having a weighted base or sole plate 10 in which is disposed the usual electric heating element 11, shown in Fig. 8 only. Secured to the sole plate 10 is a hollow, sheet metal cover or casing 12 and carried by this casing is a handle 13 by which the iron can be carried and manipulated along an ironing board. The iron has a heat control knob 14 by which the temperature of the iron may be regulated. At its rearward end, the handle 13 has a recess or chamber 15. The rearward ends of the handle 13 and sole plate 10 provide a three-point rest for the iron when the latter is placed in the substantially erect, inoperative position shown in Fig. 5.

Electric current is supplied to a pair of contact fingers 16, 17 located at the rearward end of the iron, by means of an electric cord (not shown) which is plugged into an electric service outlet. One lead 18 extends to an end of the electric heating element 11 while the other lead extends to one spring contact finger 20 of a thermostatically-controlled device 21, this contact being mounted on an insulated post 22. Also carried by the post 22 is a second spring contact finger 23 having a hole through which projects an adjusting screw 24, the end of which engages the contact 20. The screw 24 forms part of the adjusting knob 14 and by turning the latter the contact 20 is adapted to be sprung so as to arrange its contact button 20' closer to or farther from the contact button 23' of the contact 23, that is, to vary the gap therebetween. A bi-metallic thermostat element 25 is also carried by the post and has an insulated stud 26 engaging the free end of the contact finger 23.

The structure as thus far described is more or less conventional. In accordancce with the usual practice, a wire extends from the other end of the heating element 11 to the contact 23 to complete the cicuit. When current is supplied to the heating element 11, the iron becomes warm or hot, depending upon the setting of the control knob 14. When the desired heat is attained, the thermostat 25, 26 functions to separate the contact point 23' from the contact point 20' so as to disrupt the flow of current through the heating element. As the iron cools to a predetermined degree, the bi-metallic element 25 acts to allow engagement of the contact 23' against the contact 20' so as to again establish current flow to the heating element. Since the adjusting screw 24 regulates the position of the contact 20', it follows that the point of separation of the contacts, as effected by the thermostat 25, 26 is accurately controlled so as to make-and-break the circuit as the iron cools and heats between selected limits.

Thus, the iron is maintained at a substantially uniform temperature during an ironing operation. It is also to be noted that such temperature is also maintained when the iron is in its erect, inoperative position and this results in a waste of electricity. Should the iron be inadvertently left in a horizontal ironing position, it will burn through the fabric being ironed and eventually through the ironing board when the latter is made from wood.

As indicated above, it is the aim of the present invention to obviate such disadvantages of conventional, thermostatically-controlled electric irons by providing control means by which the electric circuit to the heating element is opened automatically when the iron is placed in inoperative position and attains the heat to which it is adjusted, and the circuit is also opened when the iron is inadvertently left flat in its operative position upon the ironing board or other surface. This control includes a contact arrestor means 30 located within the casing 12, and an automatic switch means 50 carried by the handle 13.

The contact arrestor means 30 consists of a wedge-shaped arrestor element or plate 33 having a bifurcated end, the sides 34 of which are positioned between the spring contact fingers 20, 23 and straddle the contact points 20', 23' and the stud 26 (Fig. 3). The rearward, forked end of the element 33 may be guided by means of flanges 35 formed at the lateral edges of the contact finger 23. At its forward end, the wedge element 33 is provided with a longitudinally-extending elongate opening 36.

A sheet metal bracket 38 is mounted within the casing 12 and carries a pin 39 to which is pivoted the intermediate portion of a rocker element 40. The element 40 has a first, curved arm 41 which projects upwardly through the opening 36 of the wedge element 33. A second arm 42 of the element 40 carries a weight in the form of a disc 43. A pin 44 carried by the disc 43 is movable in an arcuate slot 45 formed at the upper end of a damper element 46 projecting upwardly from the bracket 38.

Referring now particularly to Figs. 2 and 7, the improved iron is provided with a circuit breaker or switch 50 disposed within the recess 15 of the handle 13. The switch 50 includes a first, fixed contact finger 51 formed as part of a sheet metal bracket 52, from one end of which a wire 53 leads to the heating element 11 (Fig. 8).

A second sheet metal bracket 55 within the recess 15 is connected by a wire 56 to the thermostat contact 23. This bracket has ears 57 between which extends a pin 58 upon which a contact element 59 is pivoted. The element 59 has a contact button 60 at one end engageable with the fixed contact 51. At its other end, the element 59 carries a weight 62.

Slidable in a bore in the rearward end of the handle 13 is a plunger rod 65, the lower end of which is engageable against the contact 60 to maintain the latter against the contact 51 when the iron is being used. The plunger 65 is adapted to be depressed by means of a pressure plate 66 pivoted at 67 on the handle 13.

The fully automatic electric iron operates as follows: To prepare the iron for operation, it is set up on end as shown in Fig. 5, at which time its electric supply cord is plugged into a service outlet. Since the iron is at this time cold, the contacts 20', 23' of the thermostat 21 are closed. Also, the weight 62 of the switch contact element 59 tends to swing downwardly and thus maintains the contact 60 against the contact 51. It is thus seen that the circuit is completed through the electric heating element 11 and heat is developed by this resistance unit. As the temperature of the iron approaches that to which the thermostat is set, the operator may tilt the iron downwardly to its horizontal position, as shown in Fig. 1, to perform an ironing operation.

At this time, the operator grasps the handle 13 and simultaneously depresses the pressure plate 66 which then acts through the plunger 65 to move the contact 60 into engagement with the fixed contacts 51 of the switch 50. By following this procedure, the circuit is maintained closed. When the temperature of the iron reaches the degree to which the thermostat is set, the contacts 20', 23' will open, and subsequently close when the temperature falls slightly below the setting. This action is repeated automatically to maintain the temperature between close limits.

In the event that the operator moves from the ironing board and inadvertently leaves the iron in its horizontal position, when the pressure plate 66 is released the weight 62 acts to tilt the contact element 59 upwardly to withdraw the contact 60 from the contact 51, with the plunger 65 sliding upwardly. Thus, by the automatic action of the weighted contact element 59 the circuit is opened to disrupt the flow of current to the heating element 11 and the iron is caused to cool so as to guard against the danger of fire.

During the ironing operation, the user may occasionally set the iron up on end in the substantially vertical position shown in Fig. 5. At this time, the weight 43 tends to swing the finger 41 downwardly. If the temperature of the iron is at its low limit, the contacts 20', 23' are engaged and downward sliding movement of the wedge element 33 is prevented. However, when these contacts are snapped apart under the action of the thermostat element 26, as the temperature reaches maximum, the wedge element 33 is free to slide downwardly under the action of the weight. The wedge or arrestor thus is caused to move into position between and maintain the contacts 20', 23' separated and the circuit open, even through the switch contacts 60, 51 are maintained closed by the action of the weight 62, the positions of the various parts then being as illustrated in Figs. 5, 6 and 7.

The electric iron thus will continue to cool as long as this condition prevails. Consequently, when the iron is left unattended, cooling of the iron is automatically effected, the cooling process usually requiring approximately thirty minutes. When the iron is left in erect position for only a short period of time and the operator again grasps the handle 13 and pressure plate 66 to return the iron to the operative position of Fig. 1, the contacts 60, 51 are closed and the weight 43 swings to the position shown in Figs. 1 and 4 whereby to withdraw the wedge element 33 from between the contacts 20', 23'. The contacts 20', 23' thus are permitted to again engage in response to the action of the thermostat element 26 and normal operation of the iron is restored.

It will be observed from the foregoing that my invention provides a fully automatic electric iron which is highly practical and efficient in operation. In accordance with one feature of the invention, there is embodied in the electric circuit to the heating element a switch which, when closed, allows current flow to the heating element. This switch has a weight-actuated contact element which is arranged to close the switch in response to actuation of a pivoted pressure plate and plunger engaged by the operator during an ironing operation. In the event that the iron is inadvertently left in ironing position upon the ironing board while connected to the source of electricity, the weight-actuated contact element functions to immediately withdraw the movable contact from the fixed contact upon release of the pressure plate by the operator. Such opening of the circuit results in inactivation of the heating element to allow cooling of the iron so as to minimize the danger of fire. This is an important improvement over conventional electric irons having no such safety feature and which, when left upon the ironing board in ironing position for a period of time, will remain hot and burn the ironing board cover and pad and eventually burn through the board itself. Due to the provision of the weight-actuated contact element, when the iron is tilted upwardly to inoperative position, the weight operates to maintain the switch closed so as not to interfere with the normal heating of the iron.

As another important feature, the present improved electric iron includes means for opening the heater circuit after the iron has remained in its upright, inoperative position for a short length of time. This means consists of a wedge element which, when the iron is in its upright, inoperative position, is urged under the action of a weight-actuated means toward the thermostat contacts of the iron. When these contacts snap apart, due to the action of the bimetallic thermostat element when the iron reaches its maximum temperature, the wedge element is moved by the weight-actuated means to a position between the open thermostat contacts to provide a block or spacer therebetween preventing closing of these contacts while the iron remains in its inoperative position. By this means, the circuit is maintained open so that the iron gradually cools. Thus, when the iron is left in its standing position for a period exceeding a few minutes, the iron is deenergized to conserve electric current. In cases where the iron is inadvertently left in its inoperative position over a long period of time, the weight-actuated wedge element serves to prevent burning out of the resistance heating element. When the iron is restored to its ironing position, the weight-actuated means functions to withdraw the wedge element from between the thermostat contacts to restore the iron to its normal operation wherein the heating element is periodically energized in response to closing and opening of the thermostat contacts.

It is thus seen that the present, fully automatic iron safeguards against fire hazard and further functions to conserve electric current and thus materially reduce the over-all cost of operatnig the iron.

In accordance with the provisions of the patent statutes, I have herein described the principle of the invention, together with a preferred form of construction of the improved controls for the electric iron. I wish to have it understood, however, that modifications might be made in the structure and arrangement of parts without departing from the spirit or scope of the invention as defined in the appended claims.

I claim as my invention:

1. A fully automatic electric iron, including: a base; a casing attached thereto; a handle carried by the casing; an electric heating element in the base and an electric circuit therefor; a pair of relatively movable thermostat contacts in said circuit for opening and closing the same; a bimetallic thermostat element operative to effect closing and opening of said thermostat contacts in response to variations in the temperature of the iron; a wedge element movable in the plane of the line of engagement of said thermostat contacts; and a weight-actuated means engaging said wedge element and operative, when the iron is placed in an erect inoperative position, to move said wedge element into position to wedge between said thermostat contacts when the latter are separated by the action of said thermostat element, so as to maintain said circuit open to allow cooling of the iron, said weight-actuated means being operative, when the iron is moved to a substantially horizontal ironing position, to withdraw said wedge element from between said thermostat contacts so as to permit closing of the latter under the action of said thermostat element.

2. An electric iron as defined in claim 1 in which said weight-actuated means includes a pivoted element having a first arm engaging said wedge element and a second arm carrying a weight.

3. An electric iron as defined in claim 1 in which said wedge element has an elongate opening therein, and in which said weight-actuated means includes a pivoted element having a first arm engaging in said opening, and a second arm carrying a weight, said pivoted element being, in effect, a bell-crank lever.

4. An electric iron as defined in claim 1 in which said thermostat contacts consist of spring contact fingers having engageable contact points at the free ends of the fingers, and in which said wedge element consists of a wedge plate having a bifurcated end, the sides of which straddle said contact points, the other end of the wedge plate having an elongate, longitudinal opening, and in which said weight-actuated means includes a pivoted element having a first arm engaging in said opening, and a second arm carrying a weight, said pivoted element being, in effect, a bell-crank lever.

5. A fully automatic electric iron, including: a base; a casing attached thereto; a handle carried by the casing; an electric heating element in the base and an electric circuit therefor; a pair of relatively movable thermostat contacts in said circuit for opening and closing the same; a bimetallic thermostat element operative to effect closing and opening of said thermostat contacts in response to variations in the temperature of the iron; a switch embodied in said circuit and including a first contact fixed within a recess in said handle and a second contact movable in said recess toward and away from said first contact to close and open the circuit, a weight carried by said second contact and operative, when the iron is placed in its erect inoperative position, to move said second contact into engagement with said first contact so as to allow closing of said circuit and operative, when the iron is placed in its horizontal operative position, to disengage said second contact from said first contact; and manually operable means movable on said handle and engageable with said second contact to move the latter into engagement with said first contact against the action of said weight.

6. An electric iron as defined in claim 5 in which said second contact includes a contact element pivoted within said recess and having a contact button at one end and said weight at its other end, and in which said manually-operable means includes a plunger slidable in a bore in said handle and having an inner end engageable against said contact element adjacent said contact button.

7. An electric iron as defined in claim 5 in which said second contact includes a contact element pivoted within said recess and having a contact button at one end and said weight at its other end, and in which said manually-operable means includes a plunger slidable in a bore in said handle and having an inner end engageable against said contact element adjacent said contact button, said manually-operable means also including a pressure plate pivoted on said handle and engageable with the other end of said plunger.

8. A fully automatic electric iron, including: a base; a casing attached thereto; a handle carried by the casing; an electric heating element in the base and an electric circuit therefor; a pair of relatively movable thermostat contacts in said circuit for opening and closing the same; a bimetallic thermostat element operative to effect closing and opening of said thermostat contacts in response to variations in the temperature of the iron; a wedge element movable in the plane of the line of engagement of said thermostat contacts; and a weight-actuated means engaging said wedge element and operative, when the iron is placed in an erect inoperative position, to move said wedge element into position to wedge between said thermostat contacts when the latter are separated by the action of said thermostat element, so as to maintain said circuit open to allow cooling of the iron, said weight-actuated means being operative, when the iron is moved to a substantially horizontal ironing position, to withdraw said wedge element from between said thermostat contacts so as to permit closing of the latter under the action of said thermostat element; a switch embodied in said circuit and including a first contact fixed within a recess in said handle and a second contact movable in said recess toward and away from said first contact to close and open the circuit, a weight carried by said second contact and operative, when the iron is placed in its erect inoperative position, to move said second contact into engagement with said first contact so as to allow closing of said circuit and operative, when the iron is placed in its horizontal operative position, to disengage said second contact from said first contact; and manually operable means movable on said handle and engageable with said second contact to move the latter into engagement with said first contact against the action of said weight.

9. A fully automatic electric iron, including: a base; a casing attached thereto; a handle carried by the casing; an electric heating element in the base and an electric circuit therefor; a pair of relatively movable thermostat contacts in said circuit for opening and closing the same; a bimetallic thermostat element operative to effect closing and opening of said thermostat contacts in response to variations in the temperature of the iron; a wedge element movable in the plane of the line of engagement of said thermostat contacts; and a weight-actuated means engaging said wedge element and operative, when the iron is placed in an erect inoperative position, to move said wedge element into position to wedge between said thermostat contacts when the latter are separated by the action of said thermostat element, so as to maintain said circuit open to allow cooling of the iron, said weight-actuated means being operative, when the iron is moved to a substantially horizontal ironing position, to withdraw said wedge element from between said thermostat contacts so as to permit closing of the latter under the action of said thermostat element; a switch embodied in said circuit and including a first contact fixed within a recess in said handle and a second contact movable in said recess toward and away from said first contact to close and open the circuit, a weight carried by said second contact and operative, when the iron is placed in its erect inoperative position, to move said second contact into engagement with said first contact so as to allow closing of said circuit and operative, when the iron is placed in its horizontal operative position, to disengage said second contact from said first contact; and manually operable means movable on said handle and engageable with said second contact to move the latter into engagement with said first contact against the action of said weight, said weight actuated means including a pivoted element having a first arm engaging said wedge element and a second arm carrying a weight.

10. A fully automatic electric iron, including: a base; a casing attached thereto; a handle carried by the casing; an electric heating element in the base and an electric circuit therefor; a pair of relatively movable thermostat contacts in said circuit for opening and closing the same; a bimetallic thermostat element operative to effect closing and opening of said thermostat contacts in response to variations in the temperature of the iron; a wedge element movable in the plane of the line of engagement of said thermostat contacts; a weight-actuated means engaging said wedge element and operative, when the iron is placed in an erect inoperative position, to move said wedge element into position to wedge between said thermostat contacts when the latter are separated by the action of said thermostat element, so as to maintain said circuit open to allow cooling of the iron, said weight-actuated means being operative, when the iron is moved to a substantially horizontal ironing position, to withdraw said wedge element from between said thermostat contacts so as to permit closing of the latter under the action of said thermostat element; a switch embodied in said circuit and including a first contact fixed within a recess in said handle and a second contact movable in said recess toward and away from said first contact to close and open the circuit, a weight carried by said second contact and operative, when the iron is placed in its erect inoperative position, to move said second contact into engagement with said first contact so as to allow closing of said circuit and operative, when the iron is placed in its horizontal operative position, to disengage said second contact from said first contact; and manually operable means movable on said handle and engageable with said second contact to move the latter into engagement with said first contact against the action of said weight, said weight actuated means including a pivoted element having a first arm engaging said wedge element and a second arm carrying a weight, said second contact including a pivoted contact element and having a contact button at one end and said weight at its other end, said manually-operable means including a slidable plunger engageable against said contact element, and a pressure plate pivoted on said handle and engageable against said plunger.

11. In an electric iron having a base, a casing, a handle, an electric heating element and an electric circuit therefor including, a thermostat device having a pair of relatively shiftable contacts for closing and opening said circuit in response to variations in the temperature of the iron, an arrester movable in said casing and operative in response to placing the iron in an erect inoperative position, when the contacts are separated, to engage between and maintain said contacts separated, and gravity actuated means operative in response to placing the iron in a horizontal operative position to shift said arrester to allow engagement of said contacts.

12. In an electric iron having a base, a casing, a handle, an electric heating element and an electric circuit therefor including, a thermostat device having a pair of relatively shiftable contacts for closing and opening said circuit in response to variations in the temperature of the iron, an elongate gravity actuated arrester of insoluble material movable in said casing and operative in response to placing the iron in an erect inoperative position and when said contacts are separated to engage between and maintain said contacts separated, and gravity actuated means in the case engaging the arrester and operative in response to placing the iron in a horizontal operative position to shift said arrester from between said contacts to allow engagement therebetween.

13. In an electric iron having a base, a casing, a handle, an electric heating element and an electric circuit therefor including, a thermostat device having a pair of contacts for closing and opening said circuit in response to variations in the temperature of the iron, a wedge-shaped arrester of dielectric material movable in said casing and operative in response to placing the iron in an erect inoperative position and when said contacts are separated to engage between and maintain said contacts separated, and gravity actuated means in the case engaging the arrester and operative in response to placing the iron in a horizontal operative position to shift said arrested from engagement between said contacts to allow engagement therebetween; a switch within said handle and having contacts connected in the circuit; and gravity actuated means movable in the handle and operative in response to placing of the iron in its erect inoperative position to close said switch contacts, said means being operative in response to placing of the iron in its horizontal operative position to open said switch contacts; and manually-operable means on said handle engageable with said movable means to maintain the latter in contact-closing position.

References Cited in the file of this patent
UNITED STATES PATENTS

| | | |
|---|---|---|
| 1,373,128 | Freese | Mar. 29, 1921 |
| 2,008,484 | Belcher | July 16, 1935 |
| 2,023,327 | Korne et al. | Dec. 3, 1935 |
| 2,343,654 | Finlayson | May 7, 1944 |
| 2,431,186 | McCullough | Nov. 18, 1947 |

FOREIGN PATENTS

| | | |
|---|---|---|
| 340,307 | Great Britain | Dec. 29, 1930 |
| 594,073 | Great Britain | Nov. 3, 1947 |